Feb. 22, 1938.  J. H. COFFEY  2,109,190
METHOD AND APPARATUS FOR MAKING RUBBER ARTICLES
Filed Aug. 26, 1935
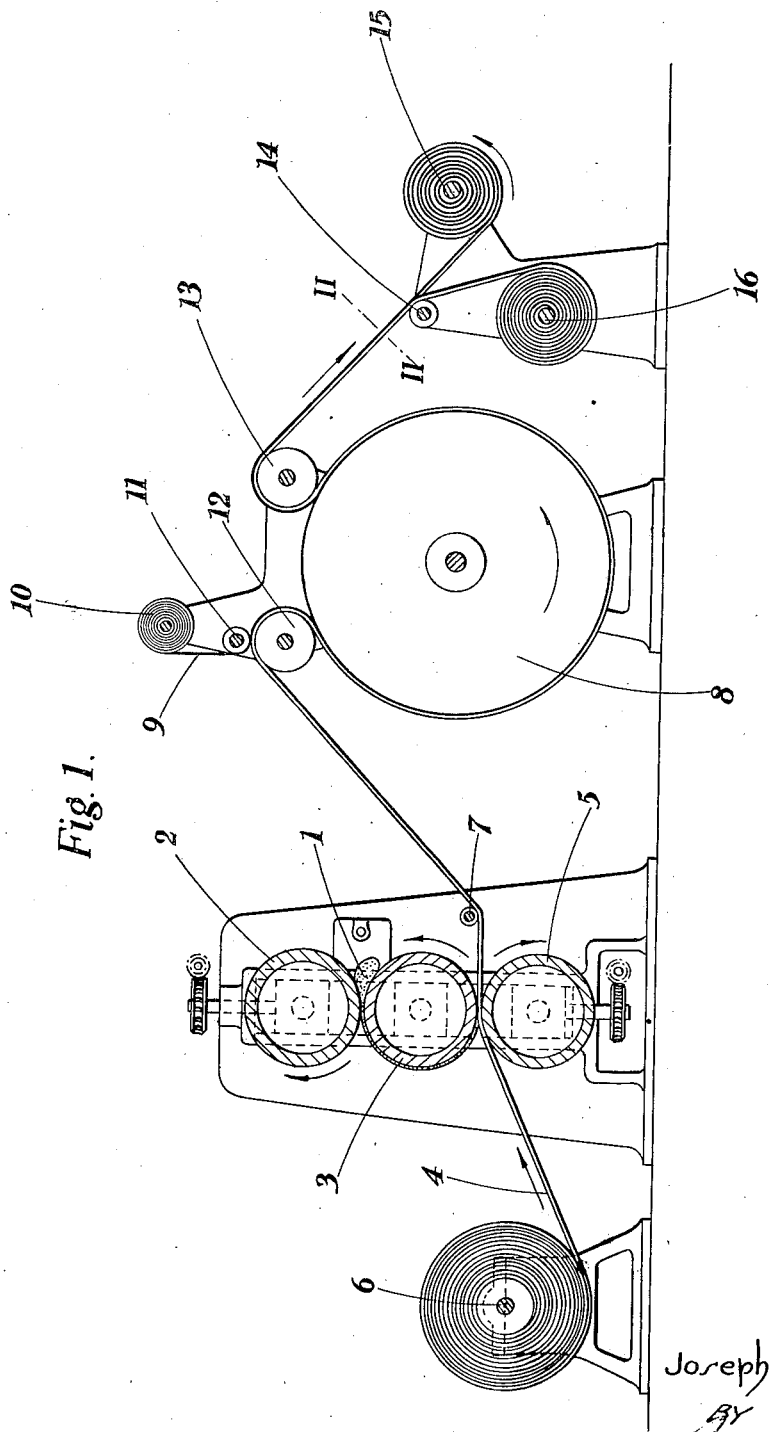
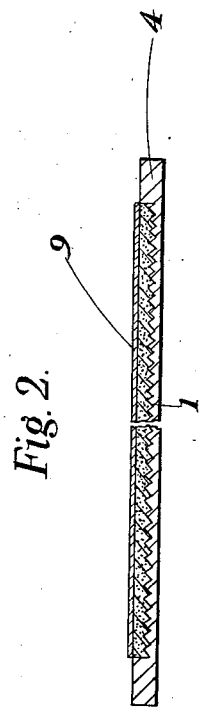
INVENTOR
Joseph Herbert Coffey
ATTORNEY Patented Feb. 22, 1938

2,109,190

UNITED STATES PATENT OFFICE 2,109,190

METHOD AND APPARATUS FOR MAKING RUBBER ARTICLES

Joseph Herbert Coffey, Rhos-on-Sea, North Wales

Application August 26, 1935, Serial No. 37,976
In Great Britain August 29, 1934

9 Claims. (Cl. 18—6)

This invention relates to the manufacture of moulded rubber articles and is particularly applicable to the manufacture of articles in relatively long lengths, such for example as matting.

An important object of the invention is to simplify and improve the manufacture of long lengths of material. Another object is to cause moulds to fill themselves and forthwith to vulcanize the contents of the filled moulds. Many other objects will be obvious from a study of the following description.

The important steps that are employed in the process of my invention are as follows: I cause a flexible mould of the length required for the final article to travel, and I fill it with plasticized rubber stock while it is travelling. I prefer to do this by causing the mould to travel in contact with a roller and feeding the plasticized stock into the nip between the roller and the mould so that the mould receives and carries away its own charge of stock while travelling. As a result the stock is pressed into contact with the mould and thus acquires the design of the mould at the moment when it has the greatest plasticity. I vulcanize the rubber while it is still in the mould and preferably while the mould is travelling and when vulcanization is complete I divide the resultant moulded article and the mould from one another.

The mould itself may be made of any material that will resist deformation and I prefer to make it of vulcanized rubber. It may advantageously be channel-shaped, the sides of the channel or cavity being substantially parallel, and the length of the cavity being that necessary for the indefinite length of the article to be moulded.

In cases where it is desired to reinforce the rubber with fabric a length of fabric may be unwound from a roller on to the plastic rubber composition as this travels with the mould. Further, any backing stock which it may be desired to apply to any such length of fabric may similarly be unwound from the roller.

In order that the invention may be clearly understood and readily carried into effect an apparatus in accordance therewith will now be described by way of example with reference to the accompanying drawing in which:—

Figure 1 shows a vertical section of the apparatus and

Figure 2 shows a transverse section on the line II—II in Figure 1 to an enlarged scale.

Plasticized rubber composition 1 is fed into the nip of two calender rolls 2 and 3 where it is sheeted to the desired thickness. The sheeted rubber laps round the lower roll 3 until it reaches the nip formed by a flexible mould 4 supported on a roller 5 located beneath the calender rollers. The mould 4 is progressed from a supply station as by unwinding from a roller 6 round which it is coiled. During the passage through the nip the plastic rubber composition is pressed into intimate contact with and acquires the design of the mould. The filled mould passes over an idler 7 and round a vulcanization drum 8. Fabric reinforcement 9 is uncoiled from a roller 10 and is brought into contact with the free surface of the rubber composition by passage over rollers 11 and 12 followed by passage in contact with the rubber round the vulcanization drum. The moulded rubber composition and reinforcing fabric together pass over the roller 13 and the moulded rubber composition, to which the reinforcing fabric is now integrally affixed, and the mould are separated at 14 and are respectively wound up on rollers 15 and 16, the latter constituting a mould receiving station.

It is to be understood that the invention is not limited to the particular kind of apparatus described above and in particular is independent of the method of causing the rubber to lap round the roll 3. As an example, a latex composition may be sprayed, blown or spread on to a revolving roller.

I claim:—

1. In the manufacture of a moulded rubber article of indefinite length according to a process utilizing a flexible mould supported in roll formation and of a length at least that of the article, the steps of continuously unrolling the mould and causing it to move, continuously feeding plasticized rubber stock to the mould as it moves, continuously vulcanizing said rubber while it is still in the mould, and stripping the article from the mould after vulcanization.

2. In the manufacture of a moulded rubber article of indefinite length according to a process utilizing a flexible mould arranged in roll formation and of a length at least that of the article, the steps of continuously unrolling the mould and causing it to move, continuously feeding plasticized rubber stock into the mould as it moves, vulcanizing said rubber while it is still in the mould, stripping the article from the mould after vulcanization, and rerolling the mould.

3. In an apparatus for use in the manufacture of moulded rubber articles of indefinite length, in combination, a flexible mould of a length at least that of the article, the mould being arranged in roll formation, means for unrolling the mould and causing it to travel, a roller, means for pressing said mould while traveling into contact with said roller, means for feeding plasticized rubber stock into the nip between the said roller and said mould whereby said mould is filled with said stock while traveling, means for vulcanizing said rubber in the mould during the continued travel thereof, and means for stripping the article from the mould.

4. In an apparatus for use in the manufacture of moulded rubber articles of indefinite length, in combination, a flexible mould of a length at least that of the article, the mould being arranged in roll formation, means for unrolling the mould and causing it to travel, a roller, means for pressing said mould while traveling into contact with said roller, means for feeding plasticized rubber stock into the nip between the said roller and said mould whereby said mould is filled with said stock while traveling, means for vulcanizing said rubber in the mould during the continued travel thereof, means for stripping the article from the mould, and means for rewinding the mould into roll formation.

5. In an apparatus for use in the manufacture of moulded rubber articles in relatively long lengths, in combination, a flexible mould adapted to receive a long length of rubber, means for causing said mould to travel, a roller, means for pressing said mould while traveling into contact with said roller, means for feeding plasticized rubber stock into the nip between the said roller and said mould whereby said mould is filled with said stock while traveling, and means for vulcanizing said stock during the continued travel of said mould comprising a vulcanizing drum and guides for causing said mould to travel in contact with said drum.

6. In an apparatus for use in the manufacture of moulded rubber articles in relatively long lengths, in combination, a flexible mould adapted to receive a long length of rubber, means for causing said mould to travel, a roller, means for pressing said mould while traveling into contact with said roller, means for feeding plasticized rubber stock into the nip between the said roller and said mould whereby said mould is filled with said stock while traveling means, for vulcanizing said stock during the continued travel of said mould, and a pair of rollers placed to receive and wind up said mould and the vulcanized rubber article, respectively.

7. In the manufacture of a moulded rubber article of indefinite length, the steps which comprise continuously feeding a flexible mould from a mould supply station to a mould receiving station and past a calender between said stations, causing the traveling mould to form with a roller of the calender a nip whereby plastic rubber stock sheeted in the calender and fed to the nip is forced into the mould as it feeds past the calender, continuously vulcanizing said rubber while it is still in the mould, and continuously stripping the moulded article from the mould after vulcanization.

8. In the manufacture of a moulded rubber article of indefinite length, the steps which comprise continuously feeding a flexible mould of a length at least that of the article to be moulded past a calender, causing the traveling mould to form with a roller of the calender a nip whereby plastic rubber stock sheeted in the calender and fed to the nip is forced into the mould as it feeds past the calender, continuously vulcanizing said rubber while it is still in the mould, and continuously stripping the moulded article from the mould after vulcanization.

9. In the manufacture of a moulded rubber article of indefinite length, the steps which comprise feeding a flexible mould of a length at least that of the article to be moulded past a calender, causing the traveling mould to form with a roller of the calender a nip whereby plastic rubber stock sheeted in the calender and fed to the nip is forced into the mould as it feeds past the calender, vulcanizing said rubber while it is still in the mould, and thereafter stripping the vulcanized and moulded article from the mould.

JOSEPH HERBERT COFFEY.